United States Patent
Bacchus

(10) Patent No.: US 10,839,524 B2
(45) Date of Patent: Nov. 17, 2020

(54) SYSTEMS AND METHODS FOR APPLYING MAPS TO IMPROVE OBJECT TRACKING, LANE-ASSIGNMENT AND CLASSIFICATION

(71) Applicant: GM GLOBAL TECHNOLOGY OPERATIONS LLC, Detroit, MI (US)

(72) Inventor: Brent N. Bacchus, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 79 days.

(21) Appl. No.: 16/201,107

(22) Filed: Nov. 27, 2018

(65) Prior Publication Data

US 2020/0167934 A1 May 28, 2020

(51) Int. Cl.
*G06K 9/00* (2006.01)
*G06T 7/246* (2017.01)

(52) U.S. Cl.
CPC .... *G06T 7/246* (2017.01); *G06T 2207/20076* (2013.01); *G06T 2207/30252* (2013.01)

(58) Field of Classification Search
CPC combination set(s) only.
See application file for complete search history.

(56) References Cited

U.S. PATENT DOCUMENTS

| | | | |
|---|---|---|---|
| 2010/0289632 A1* | 11/2010 | Seder | G06K 9/00805 340/436 |
| 2011/0022530 A1* | 1/2011 | Bogle | G06Q 10/1053 705/321 |
| 2017/0323217 A1* | 11/2017 | Saklatvala | G06N 20/00 |

OTHER PUBLICATIONS

Zhang, The Optimality of Naive Bayes, 2004, American Association for Artificial Intelligence (Year: 2004).*

* cited by examiner

*Primary Examiner* — Alex Kok S Liew
(74) *Attorney, Agent, or Firm* — Lorenz & Kopf, LLP

(57) ABSTRACT

Methods and systems for enhanced object tracking by receiving sensor fusion data related to target objects and object tracks; determining splines representing trajectories of each target object; filtering the sensor fusion data about each target object based on a first, second and third filtering model wherein each filtering model corresponds to one or more of a set of hypotheses used for processing vectors related to trajectories of a track object wherein the set of hypotheses comprise: a path constraint, a path unconstrained, and a stationary hypothesis; and generating a hypothesis probability for determining whether to use a particular hypothesis based wherein the hypothesis probability is determined based on results from the first, second and third filtering models and from results from classifying, by at least one classification model, one or more features related to the object track for the target object.

20 Claims, 12 Drawing Sheets

SYSTEMS AND METHODS FOR APPLYING MAPS TO IMPROVE OBJECT TRACKING, LANE-ASSIGNMENT AND CLASSIFICATION

BACKGROUND

The technical field generally relates to perception systems and methods, and more particularly relates to systems and methods for object tracking, lane-assignment and classification to improve a perception model to track objects Autonomous and semi-autonomous vehicles require highly accurate perception of objects to object tracks. The perception of object tracks can be subject to perspective distortions. This results in incorrect lane identification of objects. In addition, the sensor data from the vehicle sensors may contain significant noise thus, further reducing the accuracy for making lane assignments of perceived objects. Such discrepancies are problematic because autonomous vehicles, in particular, require proper identification of parked vehicles adjacent to roadways as well as stationary vehicles on the roadways.

Accordingly, it is desirable to provide systems and methods to improve a perception model for tracking vehicles and object tracks such as non-stationary vehicles on a roadway, and parked/stationary vehicles/objects on or adjacent to the roadway.

Furthermore, other desirable features and characteristics of the present invention will become apparent from the subsequent detailed description and the appended claims, taken in conjunction with the accompanying drawings and the foregoing technical field and background.

SUMMARY

A system and method for object tracking, lane-assignment and classification to improve a perception model for tracking objects by using map data and generating multiple hypotheses that takes into consideration ambiguities caused by sensed noise of the object track and for performing a probabilistic classification of a target object based on additional target object information is disclosed.

In one embodiment, a method for enhanced object tracking is provided. The method includes: receiving, by a processing unit disposed in a vehicle, sensor fusion data related to a plurality of target objects and object tracks about the vehicle; determining, by the processing unit, one or more splines representing trajectories of each target object to an object track; filtering, by the processing unit, the sensor fusion data about each target object for an object track based on a first, second and third filtering model wherein each filtering model corresponds to one or more of a set of hypotheses used for processing vectors related to trajectories of a track object wherein the set of hypotheses include: a path constraint, a path unconstrained, and a stationary hypothesis; and generating, by the processing unit, a hypothesis probability for determining whether to use a particular hypothesis wherein the hypothesis probability is determined based on results from the first, second and third filtering models and from results from classifying, by at least one classification model, one or more features related to the object track for the target object.

The method, further includes: tracking, by the processing unit, the target object, using a process model derived by the path constraint hypothesis, to a Frenet frame, and constraining, the target object, to a position in the process model represented by a parameter $u_t$ of a parametric spline modeled to a center of a lane, and a lateral position represented by a signed distance parameter $l_t$ from the lane center. Each hypothesis has a corresponding Naïve Bayes model with a likelihood $L_i(x)$ or an applicable joinder model for the $L_i(x)$.

The method, further includes: updating the hypothesis probability, by the processing unit, in a Bayesian manner using a naïve Bayes model of $$P_t(H_i \mid x) = \frac{P_t(H_i \mid x) L_i(x)}{\sum_i P_t(H_i \mid x) L_i(x)}$$

wherein a lateral position is p_i for each object i, x is track data containing at least a track position and P_t (H_i|x) is a probability of hypothesis i. The $L_i(x)$ is product of different likelihoods with a priori parameters including: $L_i(x) = N(d|\mu=100,\sigma=100) \, N(v|\mu=0,\sigma=100)$ wherein $N(x|\mu,\sigma)$ is a Gaussian PDF with mean $\mu$ and standard deviation $\sigma$ and d is the distance to next intersection and v is speed. The process model for the track object comprises:

$$u_{t+1} = u_t + \Delta T v_t \frac{\partial u_t}{\partial s}$$

to update spline parameters, $v_{t+1} = v_t + \Delta T a_t$ to update a longitudinal speed, $a_{t+1} = a_t$, to update the longitudinal speed, $l_{t+1} = l_t$ to update a lateral position offset update, and $$\phi_{t+1} = \tan^{-1} \frac{f_{y'}(u_t)}{f_{x'}(u_t)}$$

to update a lane heading wherein $u_n$ is a target spline parameter at discrete time n, $a_n$ is acceleration, and $\phi_n$ is heading angle.

The path constraint hypothesis further includes: an observation model for the track object which includes:

$$x = f_x(u_t) + \frac{W}{2} \tanh l_t \sin \phi_t$$

for an east-west position with a lateral offset correction, $$y = f_y(u_t) + \frac{W}{2} \tanh l_t \cos \phi_t$$

for a north-east position with the lateral offset correction, $v = v_t$ for the longitudinal speed, $a = a_t$ for acceleration, and $\phi = \phi_t$ for heading wherein $\phi$ is only used for initializing lane constrained tracks and the tan h(x) function is used to squash a lateral position parameter so that a range of the lateral position is from $$\left[-\frac{W}{2}, \frac{W}{2}\right]$$

wherein W is a road width. The path unconstraint hypothesis further includes: generating, a process model, for at least constant velocity for the track object which includes: $x_{t+1} = x_t + \Delta T v_t \cos \phi_t$, $y_{t+1} = y_t + \Delta T v_t \sin \phi_t$, $v_{t+1} = v_t$, $a_{t+1} = a_t$ and $\phi_{t+1} = \phi_t$. The path unconstraint hypothesis, further includes: generating, an observation model, for at least constant velocity for the track object which includes: $x=x_t$, $y=y_t$, $v=v_t$, $a=a_t$, and $\phi=\phi_t$. The stationary hypothesis further includes: generating, a process model, for at least zero speed for the track object which includes: $x_{t+1}=x_t$, $y_{t+1}=y_t$, $v_{t+1}=0$, $a_{t+1}=0$, and $\phi_{t+1}=\phi_t$. The method, further includes: generating, an observation model, for at least constant velocity for the track object which comprises: $x=x_t$, $y=y_t$, $v=v_t$, $a=a_t$, and $\phi=\phi_t$.

The spline used is a quintic $G^2$ spline with knots of x-y waypoints along a lane and which corresponds to a lane heading and a curvature value.

In another embodiment, a system including: a processing unit disposed in a vehicle including one or more processors configured by programming instructions encoded on non-transient computer readable media is provided. The processing unit is configured to: receive sensor fusion data related to a plurality of target objects and object tracks about the vehicle; determine one or more splines representing trajectories of each target object to an object track; filter the sensor fusion data about each target object for an object track based on a first, second and third filtering model wherein each filtering model corresponds to one or more of a set of hypotheses used for processing vectors related to trajectories of a track object wherein the set of hypotheses include: a path constraint, a path unconstrained, and a stationary hypothesis; and generate a hypothesis probability for determining whether to use a particular hypothesis based wherein the hypothesis probability is determined based on results from the first, second and third filtering models and from results from classifying, by at least one classification model, one or more features related to the object track for the target object.

The system, further includes: the processing unit configured to: track the target object, using a process model derived by the path constraint hypothesis, to a Frenet frame, and constrain the target object to a position in the process model represented by a parameter $u_t$ of a parametric spline modeled to a center of a lane, and a lateral position represented by a signed distance parameter $l_t$ from the lane center. Each hypothesis has a corresponding Naïve Bayes model with a likelihood $L_i(x)$ or an applicable joinder model for the $L_i(x)$.

The system, further includes: the processing unit configured to: the processing unit configured to: update the hypothesis probability in a Bayesian manner using a naïve Bayes model of $$P_t(H_i \mid x) = \frac{P_t(H_i \mid x) L_i(x)}{\sum_i P_t(H_i \mid x) L_i(x)}$$

wherein a lateral position is $p_i$ for each object i, x is track data containing at least a track position and $P_t(H_i|x)$ is a probability of hypothesis i. The Li(x) is a product of different likelihoods with priori parameters including: Li(x)=N (d|μ=100,σ=100) N(v|=μ0,σ=100) wherein N(x|μ,σ) is a Gaussian PDF with mean μ and standard deviation a and d is the distance to next intersection and v is speed.

The process model for the track object includes:

$$u_{t+1} = u_t + \Delta T v_t \frac{\partial u_t}{\partial s}$$

to update spline parameters, $v_{t+1}=v_t+\Delta Ta_t$ to update a longitudinal speed, $a_{t+1}=a_t$ to update the longitudinal speed, $l_{t+1}=l_t$ to update a lateral position offset update, and $$\phi_{t+1} = \tan^{-1} \frac{fy'(u_t)}{fx'(u_t)}$$

to update a lane heading. The system, the path constraint hypothesis further includes: an observation model for the track object which includes:

$$x = f_x(u_t) + \frac{W}{2} \tanh l_t \sin\phi_t$$

for an east-west position with a lateral offset correction, $$y = f_y(u_t) + \frac{W}{2} \tanh l_t \cos\phi_t$$

for a north-east position with the lateral offset correction, $v=v_t$ for the longitudinal speed, $a=a_t$ for acceleration, and $\phi=\phi_t$ for heading.

In yet another embodiment, a vehicle, including a perception unit including one or more processors and non-transient computer readable media encoded with programming instructions is provided. The perception unit is configured to: receive sensor fusion data related to a plurality of target objects and object tracks about the vehicle; determine one or more splines representing trajectories of each target object to an object track; filter the sensor fusion data about each target object for an object track based on a first, second and third filtering model wherein each filtering model corresponds to one or more of a set of hypotheses used for processing vectors related to trajectories of a track object wherein the set of hypotheses include: a path constraint, a path unconstrained, and a stationary hypothesis; and generate a hypothesis probability for determining whether to use a particular hypothesis based wherein the hypothesis probability is determined based on results from the first, second and third filtering models and from results from classifying, by at least one classification model, one or more features related to the object track for the target object.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
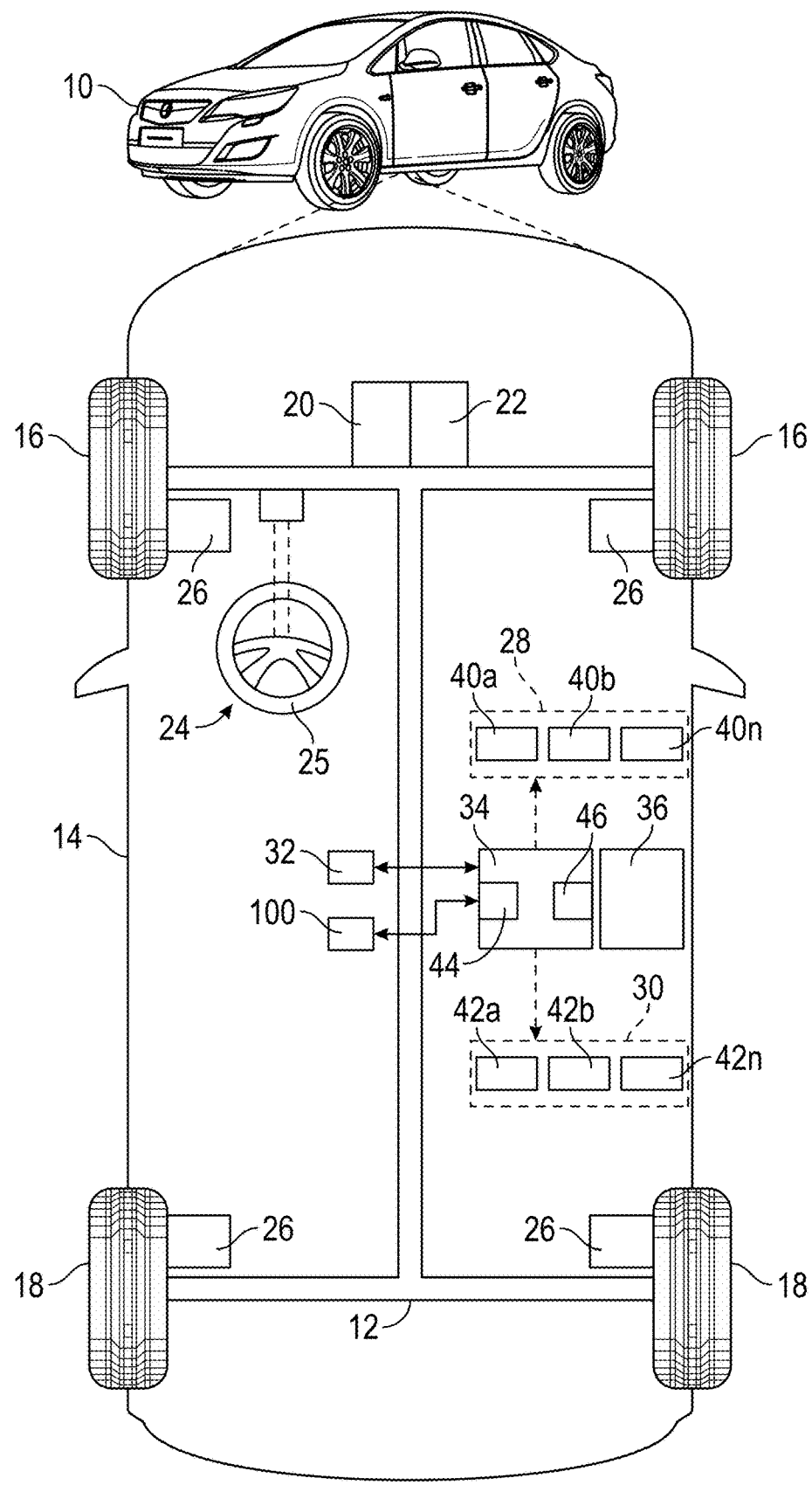
FIG. 1 illustrates a block diagram depicting an example vehicle that may include a processor for object tracking, lane-assignment and classification tracking, and lane-assignment and classification for a perception model in accordance with an exemplary embodiment.

The following detailed description is merely exemplary in nature and is not intended to limit the application and uses. Furthermore, there is no intention to be bound by any expressed or implied theory presented in the preceding technical field, background, summary, or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

Autonomous and semi-autonomous vehicles are capable of sensing their environment and navigating based on the sensed environment. Such vehicles sense their environment using multiple types of sensing devices such as radar, lidar, image sensors, and the like. In such vehicles the sensed data can be fused together with map data to identify and track objects in the vicinity of the vehicles.

In various exemplary embodiments, the present disclosure describes systems and methods using map fusion algorithms for providing the functionality on top of sensor fusion object tracks of: correcting the position of moving target vehicles to better align the target vehicles with the road geometry (using map data); processing sensor fusion tracks to alleviate deficiencies such as noise and track splitting; and classifying vehicles into several categories, such as stationary and parked vehicles.

In various exemplary embodiments, the present disclosure describes systems and methods for achieving such functionalities using banks of extended Kalman filters (EKFs), where each bank corresponds to a number of different hypotheses for a particular target object. These hypotheses include different statistical models, which incorporate variables such as the targets coordinates in the Frenet frame (longitudinal and lateral road coordinates) and velocity. Each instance a sensor fusion containing an object message is received, the corresponding bank of filters is updated along with the probability of each hypothesis, the top N hypotheses are outputted as a separate message (where typically N=3). The hypothesis type and probabilities can then be used by downstream modules to determine lane assignment and dynamic properties of objects. In addition to the Kalman filters, the system may also implement gating-based association for cases when object IDs switch or are split into multiple tracks. The filters may also tuned to further reduce the noise in sensor fusion tracks.

In various exemplary embodiments, the present disclosure describes systems and methods for object tracking, lane-assignment and classification of a perception model to improve the perception model accuracy for the tracking, lane-assignment and classification determinations of objects by using map data and by generating multiple hypotheses that take into consideration ambiguities caused by sensed noise of the object track and for performing a probabilistic classification of a target object based on additional target object information.

In various exemplary embodiments, the present disclosure describes systems and methods for training a perception model by fusing data of multiple views to reduce data imperfections and increase spatial coverage and reliability of the vehicle object tracking, lane-assignment and classification to improve estimations of the surroundings.

In various exemplary embodiments, the present disclosure describes systems and methods for training a perception model for generating tracking, lane-assignments and classification by supervision to assess objects of interest in an image.

In various exemplary embodiments, the present disclosure describes systems and methods for training a perception model by supervision and by estimation taking into consideration both intrinsic and extrinsic map data of objecting tracking and trajectories.

FIG. 1 illustrates a block diagram depicting an example vehicle that may include a processor for object tracking, lane-assignment and classification tracking, and lane-assignment and classification of a perception model 100. In general, the mapping data is fused into a perception model (or simply "system") 100. The system 100 determines the correct position of moving target vehicles to better align with the road geometry using map data. The system 100 processes sensor fusion tracks to alleviate deficiencies such as noise and track splitting. The system 100 classifies vehicles into several categories, such as stationary and parked, for the training of the perception model for tracking objects.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The vehicle wheels 16-18 are each rotationally coupled to the chassis 12 near a respective corner of the body 14. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in this example, includes an electric machine such as a permanent magnet (PM) motor. The transmission system 22 is configured to transmit power from the propulsion system 20 to the vehicle wheels 16 and 18 according to selectable speed ratios.

The brake system 26 is configured to provide braking torque to the vehicle wheels 16 and 18. Brake system 26 may, in various exemplary embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some exemplary embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10 and generate sensor data relating thereto.

The actuator system 30 includes one or more actuator devices 42a-42n that control one or more vehicle features such as, but not limited to, the propulsion system 20, the transmission system 22, the steering system 24, and the brake system 26. In various exemplary embodiments, the vehicle 10 may also include interior and/or exterior vehicle features not illustrated in FIG. 1, such as various doors, a trunk, and cabin features such as air, music, lighting, touch-screen display components, and the like.

The data storage device 32 stores data for use in controlling the vehicle 10. The data storage device 32 may be part of the controller 34, separate from the controller 34, or part of the controller 34 and part of a separate system.

The controller 34 includes at least one processor 44 (integrate with system 100 or connected to the system 100) and a computer-readable storage device or media 46. The processor 44 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which includes an ordered listing of executable instructions for implementing logical functions. The instructions, when executed by the processor 44, receive and process signals (e.g., sensor data) from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

As an example, the system 100 may include any number of additional sub-modules embedded within the controller 34 which may be combined and/or further partitioned to similarly implement systems and methods described herein. Additionally, inputs to the system 100 may be received from the sensor system 28, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like.

Figure 2:
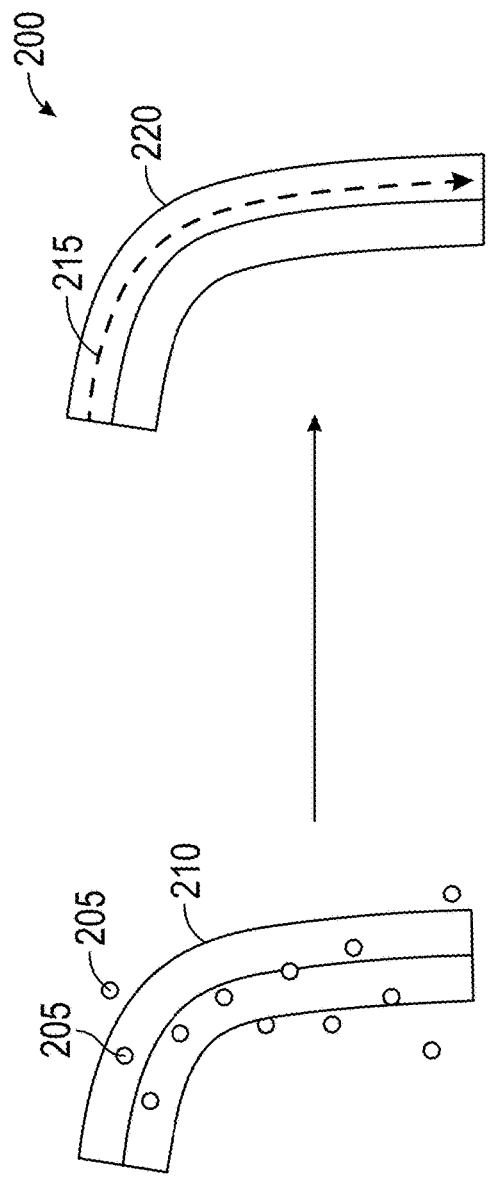
FIG. 2 illustrates a diagram of a perception model for lane constraint tracking by supervising training in accordance with an exemplary embodiment.

FIG. 2 illustrates a diagram of a perception model 200 for lane constraint tracking by supervising training in accordance with an embodiment. In FIG. 2, a camera based sensor fusion for distant targets is shown were in a current tracking the target objects 205 are identified in a track 210 which is not constrained to the roadway. With considerations by constraints for lanes and online calibration (i.e. lane constraint tracking (LCT)), the target objects 215 are constrained to the roadway and the correct lane 220. The model lane segments configured as smooth curves or splines can be represented by the parametric representation of lane coordinates as follows: $x=f_x(u)$, $y=f_y(u)$, $u \in [0,1]$ in 2D (e.g. $f_x(u) = \Sigma_{n=0}^{5} a_n u^n$, etc.) for a single or quintic spline where $f_x(u)$ and $f_y(u)$ are, respectively, the spline functions for the x and y Cartesian coordinate of the lane center.

Figure 3:
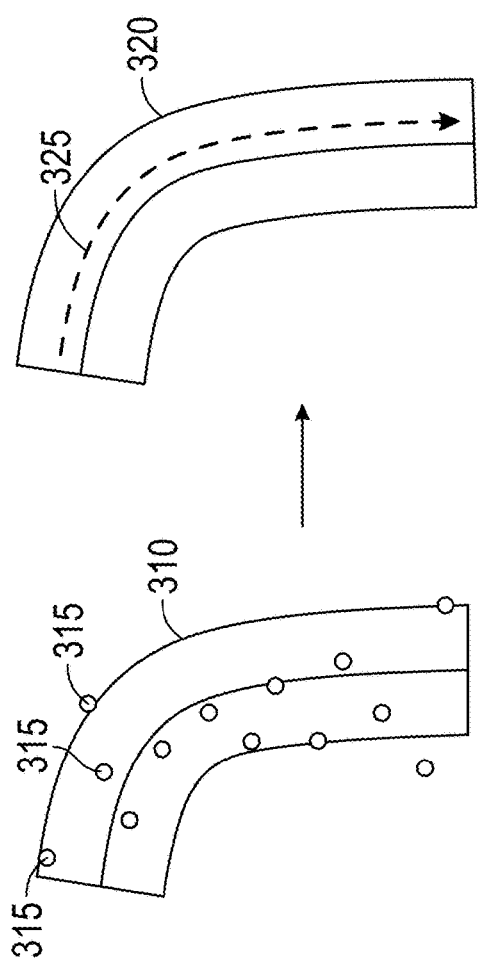
FIG. 3 illustrates a diagram for object tracks of a perception system using map data in accordance with an exemplary embodiment.

FIG. 3 illustrates a diagram for object tracks of a perception system using map data in accordance with an embodiment. In FIG. 3, the objects 315 are perceived with inaccurate lane assignments in track 310 because of ambiguities from unwanted noise and from range affects. In FIG. 3, the objects 325 are calibrated and multiple hypotheses are used to compensate for range ambiguities caused by sensing noise in, for example, track 320 resulting in an accurate lane assignment. The modeling for the LCT uses a track position along with a curve parameter with state variables; $u_n$—target spline parameter at discrete time n; $s_n$—target speed (along lane); $a_n$—acceleration; $\phi_n$—heading angle; $\omega_n$—turn rate; One way lanes are modeled with different heading signs. The Observation model includes coordinates and parameters of: $x=f_x(u)$, $y=f_y(u)$; and $v_x=s\cos\phi$, $v_y=s\sin\phi$.

Figure 4:
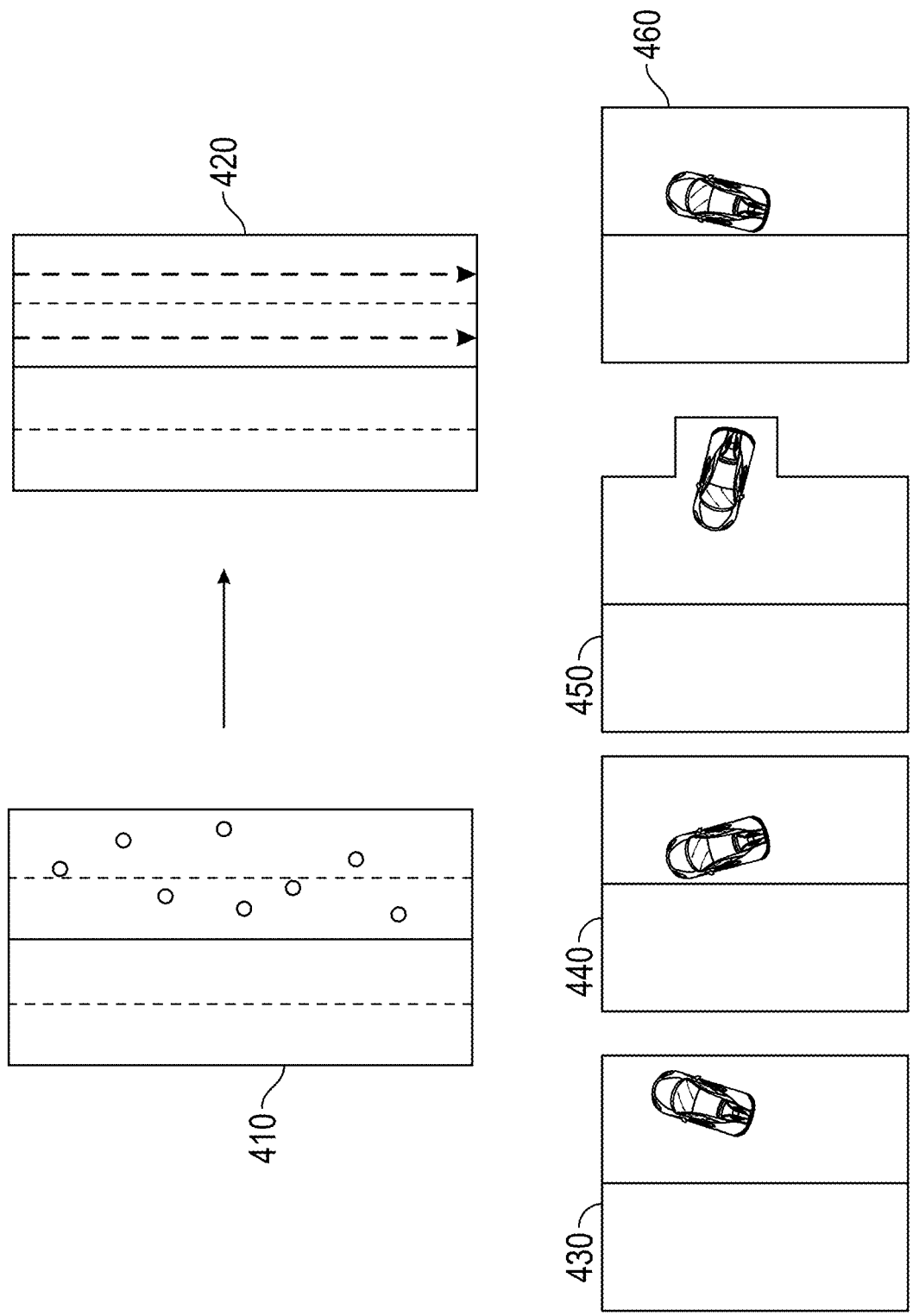
FIG. 4 illustrates a diagram of object tracks with target lane ambiguities resolved by using hypothesis for object tracks in accordance with an exemplary embodiment.

FIG. 4 illustrates a diagram of objects in a track 410 with target lane ambiguities resolved by using hypothesis P1 and P2 for objects in a track 420 in accordance with an exemplary embodiment. The target lane ambiguities may result from a vehicle parked curbside 430, a vehicle stopped 440, an off-road parked vehicle 450, or a moving vehicle 460. In other words, a host of vehicular placements and maneuvers can result in improper lane assignments of the vehicle that may result in improper object track determinations.

Figure 5:
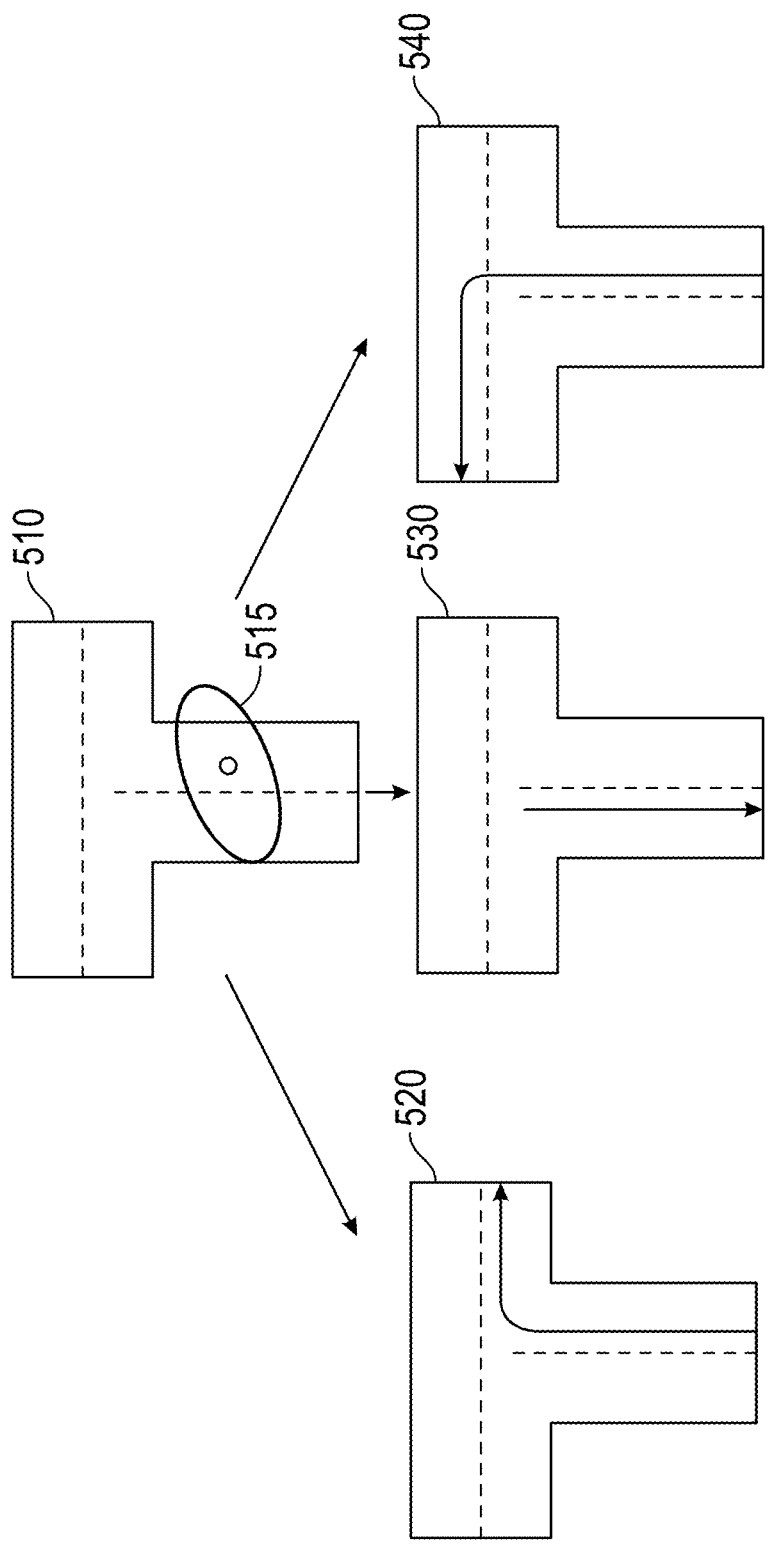
FIG. 5 illustrates a diagram of multiple object models for trajectory and object tracks of the perception system in accordance with an exemplary embodiment.

FIG. 5 illustrates a diagram of multiple object models for trajectory for object tracks of the perception system in accordance with an embodiment. In FIG. 5, an object 515 is tracked on a path 510 and can have multiple trajectories of directions such as: on a path 520 and of making a right turn, on a path 530 of following a straight direction but in a different lane, and on a path 540 of making a left turn. The perception system utilizes different models for each possible lane constrained target path: such as a straight path, U-turn, left turn, etc. The default model for unconstrained tracking (e.g. target goes off road) CV, CTRV, CTRA, etc. which are solvable with variations of Kalman filters, particle filters, etc., interacting Multiple Model (IMM), Markov chain representing model transition probabilities, and also solvable by model probabilities tracked.

Figure 6A:
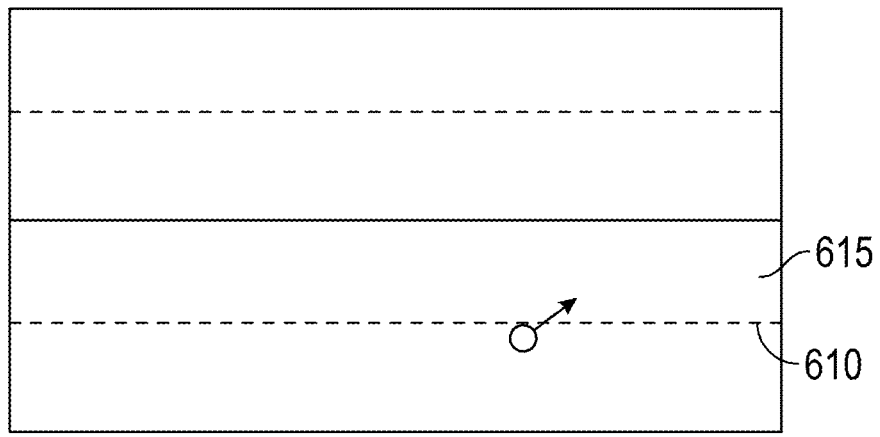
FIGS. 6A and 6B illustrate diagrams of noisy ambiguous track assignments and estimated trajectories using different filters by the perception system in accordance with an exemplary embodiment.
Figure 6B:
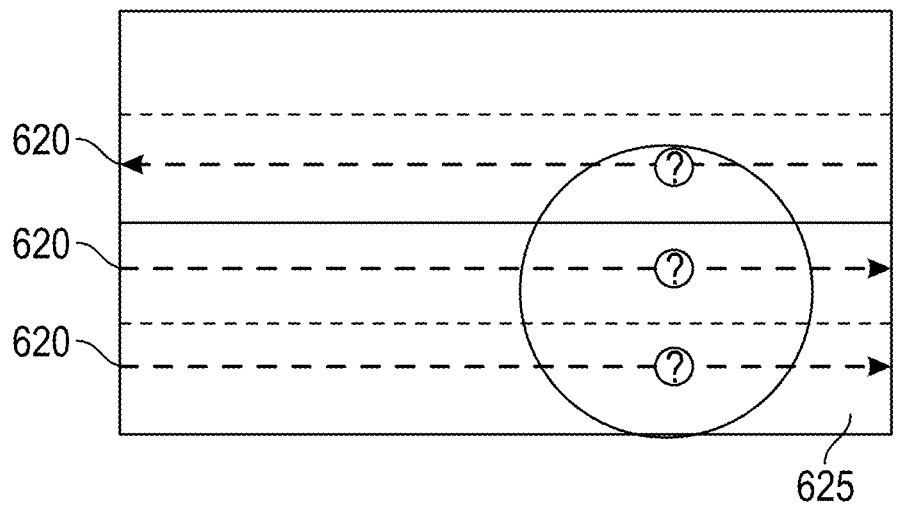

FIGS. 6A and 6B illustrate diagrams of noisy ambiguous track assignments and estimated trajectories using different filters by the perception system in accordance with an embodiment. In FIG. 6A, an unsupervised or unconstrained perception model is illustrated for a targeted object 610 on a noisy track 615 were the lane assignment is ambiguous and using a first type of Kalman filter for each track by the perception system. The lane assignment or the trajectory of the targeted object 610 is calculated using the unconstrained model to compute a likelihood of an input. However, this calculated input may have little if any effect on the targeted object 610 position calculated and the position calculated therefore acts as a fall back or default position when the lane assignment fails to be determined. A second type of Kalman filter is for a stationary model where the perception model makes the assumption that the target object 610 is stationary (i.e. the target object 610 has no velocity) and the filtering model is optimized for a non-moving target object 610. The third type of Kalman filter is illustrated in FIG. 6B for a constrained or supervised training of a perception model where the perception model constrains the object 625 to a Frenet frame (i.e. a longitudinal and lateral position along path 620). The position of the object 625 is given by $f_x(u)$, $f_y(u)$); of splines parameterized by u (longitudinal distance or arbitrary parameter). As can be appreciated, the number of constrained Kalman filters is dynamic and based on any number of parameters u.

Figure 7:
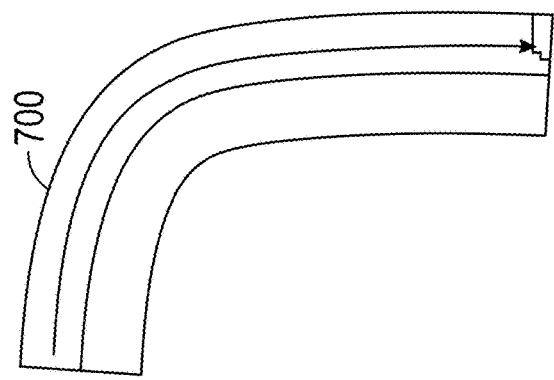
FIG. 7 is a diagram of a lane representation for object tracks using the map fused data in accordance with an exemplary embodiment.

FIG. 7 is a diagram of a lane representation using the map fused data in accordance with an embodiment. The model lane segments 700 for example can be modeled as smooth curves (e.g. splines) by using a parametric representation of a set of lane coordinates of: $x=f_x(u)$, $y=f_y(u)$, $u \in [0,1]$ in 2D (e.g. $f_x(u)=\Sigma_{n=0}^{3} a_n u^n$ for cubic spline) and relevant quantities of: Distance along lane $$l(u) = \int_0^u \sqrt{\frac{\partial f_x^2}{\partial u} + \frac{\partial f_y^2}{\partial u}}\, du;$$

Heading angle $$\phi(u) = \pm\tan^{-1}\left(\frac{\frac{\partial f_y}{\partial u}}{\frac{\partial f_x}{\partial u}}\right);$$

Speed $$s(t) = \frac{\partial l}{\partial t};$$

and Turn rate $$\omega(u) = \frac{\partial \phi}{\partial u}\frac{\partial u}{\partial l}\frac{\partial l}{\partial t}.$$

This results in the candidate paths that can be optimized

Figure 8:
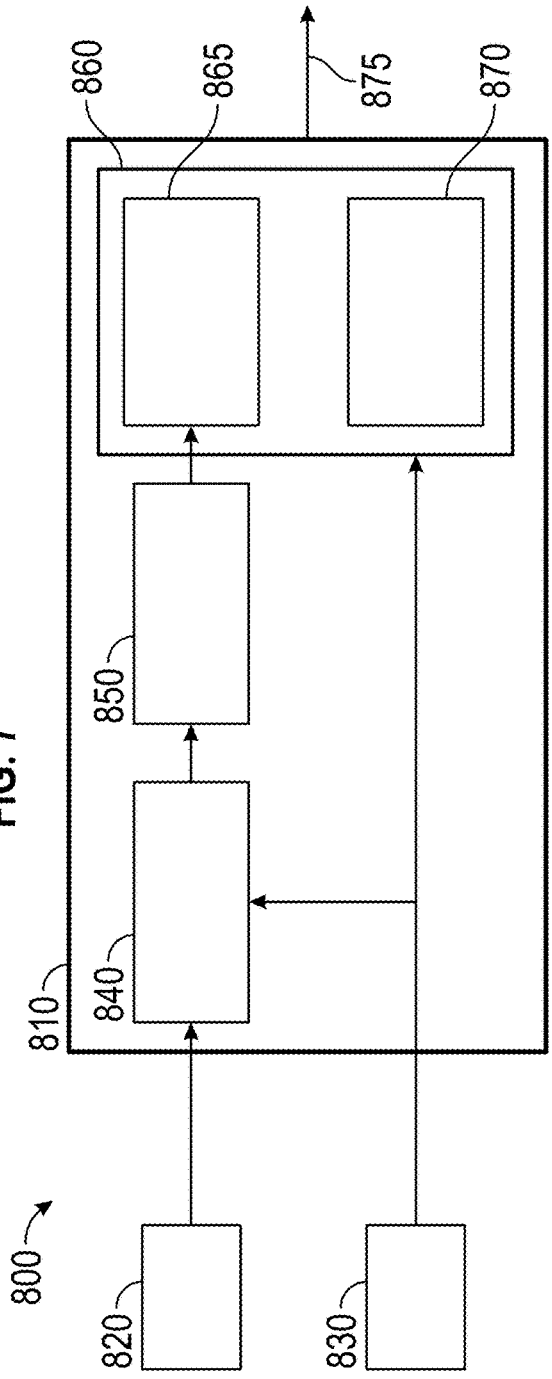
FIG. 8 illustrates a functional diagram of lane constraint tracking (LCT) for use in the perception system in accordance with an exemplary embodiment.

FIG. 8 illustrates a functional diagram of lane constraint tracking (LCT) system 800 for use in the perception system in accordance with an embodiment. Instead of proposing an entirely new path based on maplets 820 and upon receipt of additional data (i.e. sensor fusion data 830 of a targeted object) to the LCT system 810, an incremental update of a path is determined and a dynamic modification of the spline (e.g. adding/deleting knots) is generated by the LCT system 810. The spline parameterization of the LCT system 810 can be changed from [0,1] to [0,L] where L is the candidate (i.e. target object) path length. The candidate path length can be approximated by summing the distances between each added knots. It is also possible to integrate the summed distances directly into LCT system 810 and the data of targeted objects can be applicable to pedestrians (e.g. walking on sidewalk vs. off) and can be extended to the z axis for (3D) object tracking. In various embodiments, the LCT system 810 includes a target path enumeration module 840 for receiving the maplets 820 and the sensor fusion 830. The target path enumeration module 840 associates the target object with a tracked object. The lane representation module 850 determines the lane assignment and dynamic properties of the tracked object. The tracked objects have several splines represented by nearby target trajectories. The multiple model (MM) filter 860 applies Markov chain representing model transition probabilities and Model probabilities tracking applications to the tracked object. That is, lane constrained models 865 track the object by object vectors using Kalman filters based on each lane constrained hypothesis (equal to the number of splines) as wells as stationary hypotheses, and unconstrained models 870 track object properties such as acceleration and velocity. An output 875 is generated based on a list of hypothesis with certain checks performed to determine which hypotheses are feasible based on the sensor fusion 830 and maplets 820 (i.e. mapping data).

Figure 9:
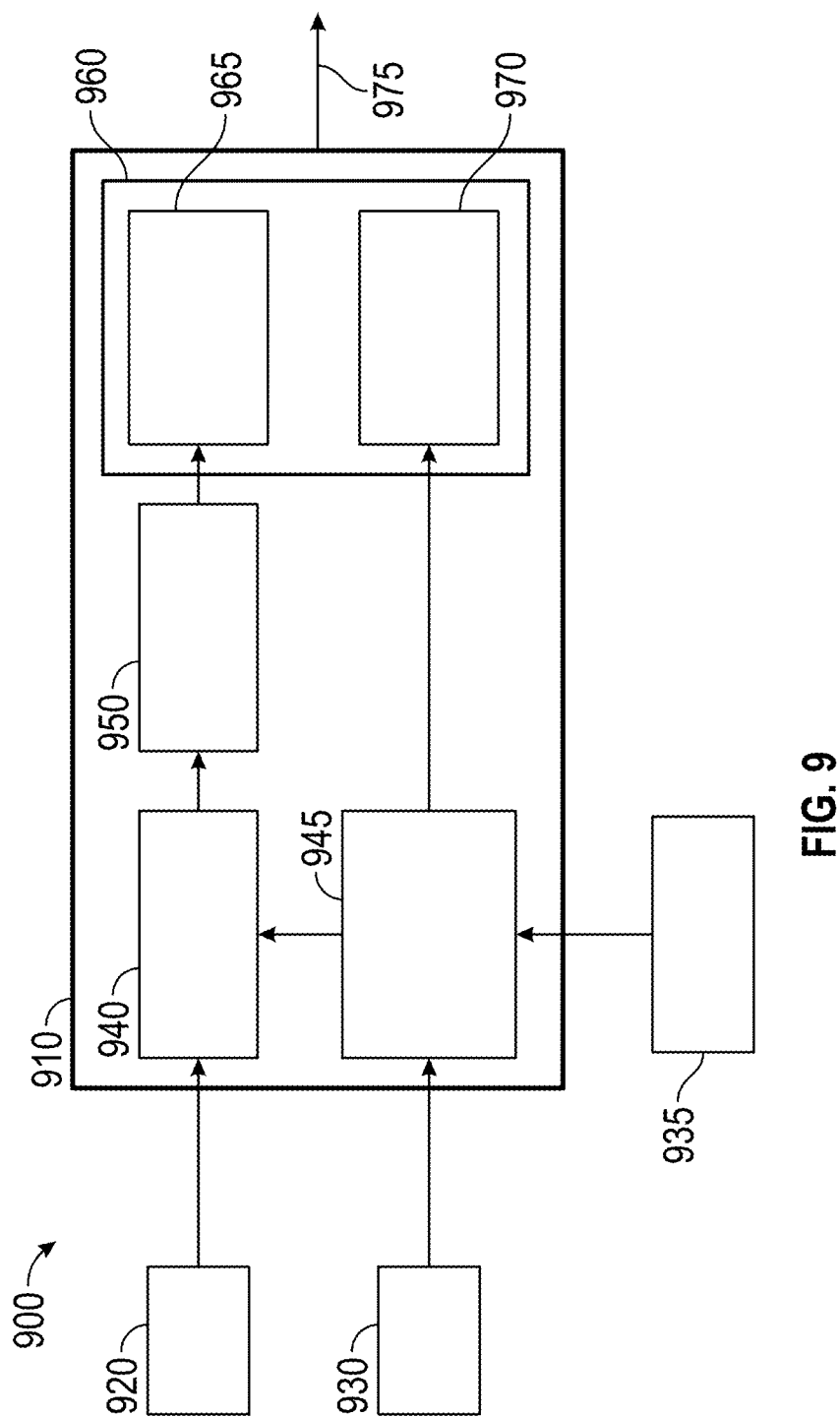
FIG. 9 illustrates a functional diagram of lane constraint tracking (LCT) with a global reference frame for use in the perception system in accordance with an exemplary embodiment.

FIG. 9 illustrates a functional diagram 900 of lane constraint tracking (LCT) system with a global reference frame for use in the perception system in accordance with an embodiment. Like in FIG. 8, instead of proposing an entirely new path based on maplets 920 and upon receipt of additional data (i.e. sensor fusion data 930 of a targeted object) to the LCT system 910, an incremental update of a path is determined and a dynamic modification of the spline (e.g. adding/deleting knots) is generated by the LCT system 910. The spline parameterization of the LCT system 910 can be changed from [0,1] to [0,L] where L is the candidate (i.e. target object) path length. The candidate path length can be approximated by summing the distances between each added knots. It is also possible to integrate the summed distances directly into LCT system 910 and the data of targeted objects can be applicable to pedestrians (e.g. walking on sidewalk vs. off) and may be extended to the z axis for (3D) object tracking by position data 935 and by the global reference frame conversion 945. That is, an additional layer of tracking is provided by coordinate constraints to spline representations of a lane based on the position data 935 integrated with the sensor fusion 930 by the global reference frame conversion 945.

In various exemplary embodiments, the LCT system 910 includes a target path enumeration module 940 for receiving the maplets 820 and the coordinate constraint data from the global reference frame conversion 945 of the position data 935 and the sensor fusion 930. The target path enumeration module 940 associates the target object with a tracked object. The lane representation module 950 determines the lane assignment and dynamic properties of the tracked object. The tracked objects have several splines represented by nearby target trajectories. The multiple model (MM) filter 960 applies Markov chain representing model transition probabilities and Model probabilities tracking applications to the tracked object. That is, lane constrained models 965 tracks the object by object vectors using Kalman filters based on each lane constrained hypothesis (equal to the number of splines and coordinate constrained to the spline representation of the lane) as wells as stationary hypotheses, and the unconstrained models 970 tracks object properties such as acceleration and velocity. An output 975 is generated based on a list of hypothesis with certain checks performed (i.e. coordinate constraints of spline representations) to determine which hypotheses are feasible based on the sensor fusion 930, position data 935 and maplets 920 (i.e. mapping data).

Figure 10:
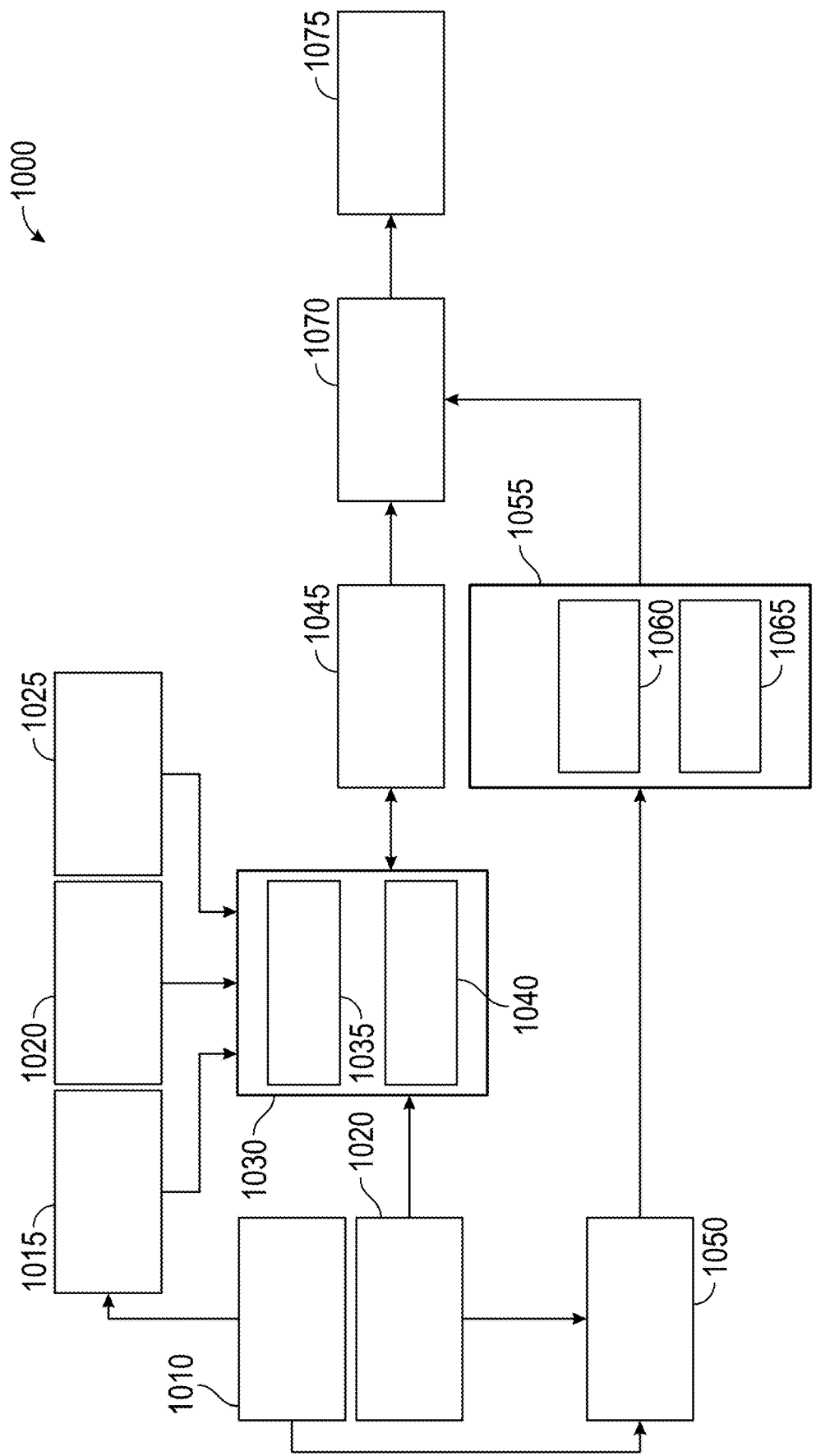
FIG. 10 illustrates a functional block diagram for a map fusion in the perception system in accordance with an exemplary embodiment.

FIG. 10 illustrates a functional block diagram for a map fusion system 1000 of the perception system in accordance with an embodiment. The functional diagram includes inputs of candidate paths 1010 and pre-processed tracks 1020. The candidate paths are all potential trajectories a vehicle may take in relation to a tracked object. The paths may be broken down into smaller segments to reduce overlap. The candidate paths 1010 are sent to the path constrained model 1015 and to the feature computation 1050. In the constrained model 1015, the objects tracked in Frenet frame and the longitudinal and lateral positions of the object are tracked.

The pre-processed tracks are sent to the Kalman filters 1030 and to the feature computation 1050. The feature computation 1050 generates features for classification by the classification models 1055. The path constrained model 1015, the unconstrained model 1020 (i.e. constant velocity, acceleration, etc. models), and the stationary model 1025 (i.e. where zero speed is assumed for the tracked object) send path and object data to the Kalman filters 1030. The track states 1045 communicate with the Kalman filters 1030 and send track state data to the hypothesis probability update 1070. Also, the hypothesis probability update 1070 receives data from the classification models 1055 because each hypothesis has a corresponding Naïve Bayes model (i.e. classification model 1055) with a likelihood $L_i(x)$ The classification models 1055 include but are not limited to: Naïve Bayes model 1 (1060) and Naïve Bayes model K (1065). The Kalman filters 1030 include a robust Kalman filter 1 (1035) and a robust Kalman filter N. The hypotheses 1075 is received from the hypothesis probability update 1070.

For every input track (i.e. candidate paths 1010 or pre-processed tracks 1020), multiple hypotheses $\{H_i\}$ are created at 1075. The hypotheses 1075 are formed by using unconstrained filter (unconstrained model 1020), by using stationary filter (stationary model 1025), and dynamically by data amounts analyzed by constraint filter operations of candidate paths (i.e. the path constrained model 1015). Each hypothesis has corresponding Naïve Bayes model with likelihood $L_i(x)$ as follows: a single Naïve Bayes model 1060 or multiple Naïve Bayes models K 1065. The probabilities for each hypotheses 1075 are updated in Bayesian manner using a filter likelihood function and a naïve Bayes model and calculated as follows:

$$P_t(H_i \mid x) = \frac{P_t(H_i \mid x)L_i(x)}{\sum_i P_t(H_i \mid x)L_i(x)}$$

Where x is the track data containing track position, dynamics, brake light status, distance to intersection, etc. $P_t(H_i|x)$ is probability of hypothesis i and $L(x)$ can be written as the product of different likelihoods with a priori parameters (e.g. $L(x)=N(d|\mu=100,\sigma=100)\ N(v|\mu=0,\sigma=100)$) where $N(x|\mu,\sigma)$ is a Gaussian PDF with a mean $\mu$ and a standard deviation $\sigma$, and d is the distance to the next intersection and v is speed. The internal variables track each unique object from the sensor fusion of an associated track object. The track objects can have several splines representing nearby potential candidate trajectories. The tracks objects have a vector of Kalman filters for each lane constrained hypothesis (equal to the number of splines) as wells as for the stationary hypotheses (i.e. based on data from the stationary model 1025). The trajectories are vectors of potential lane level trajectories within a current horizon (e.g. 100 m) that a target object may follow (in ground coordinates). The algorithm includes: hypotheses summarized in Table 1.0 which include several different types of hypotheses that can be used in a map fusion, along with the state variables and other features.

TABLE 1.0

| Hypothesis | States/features | Notes |
|---|---|---|
| Lane constrained | Spline parameter for longitudinal position Lateral position parameter Speed Heading Acceleration | Dynamically created, depending on the number of nearby lane |
| Stationary-parked roadside | Cartesian position Lateral position Heading | Single hypothesis Speed fixed at zero |

TABLE 1.0-continued

| Hypothesis | States/features | Notes |
| --- | --- | --- |
| Stationary | Cartesian position<br>Lateral position<br>Heading | Single hypothesis<br>Speed fixed at zero |

The hypotheses are represented by a combination of extended Kalman filters (EKFs) (i.e. Robust Kalman filters N 1040) and naïve Bayes models K 1065. The EKFs are used to filter object positions, speeds and headings, while the naïve Bayes models are used to classify stationary vehicles using features such as lateral lane position. The likelihood of these features can be determined by Gaussian distributions with a set of fixed parameters. For example, the likelihood of parked roadside hypothesis can be determined by the likelihood that peaks at a lateral position of 1.5 m are within a standard deviation of 1.0 m.

In an exemplary embodiment, the Kalman filters 1030 for the lane constrained hypotheses (i.e. input received from the path constrained model 1015) is as follows: first, the EKFs for the constrained hypotheses use a variation of the constant acceleration (CA) and constant velocity (CV) process models. The position of the target is tracked in the Frenet frame, where the longitudinal position is represented by the parameter $u_t$ of a 2-D parametric spline model for the modelling of the center of the lane, and the lateral position is represented by the signed distance parameter $l_t$ from the lane center (note that this parameter may not necessarily be equal to the lateral position). The process model (i.e. unconstrained model 1020) is given by:

$$u_{t+1} = u_t + \Delta T v_t \frac{\partial u_t}{\partial s} \quad \text{- spline parameters update}$$

$$v_{t+1} = v_t + \Delta T a_t \quad \text{- longitudinal speed update}$$

$$a_{t+1} = a_t \quad \text{- longitudinal speed update}$$

$$l_{t+1} = l_t \quad \text{- lateral position offset update}$$

$$\phi_{t+1} = \tan^{-1}\frac{fy'(u_t)}{fx'(u_t)} \quad \text{- lane heading update}$$

where $$\frac{\partial s}{\partial u} = \sqrt{\frac{\partial f_x(u)^2}{\partial u} + \frac{\partial f_y(u)^2}{\partial u}}$$

and $f_x(u)$ and $f_y(u)$ are, respectively, the spline functions for the x and y Cartesian coordinate of the lane center.

The observation model (i.e. the classification models 1055) is given by:

$$x = f_x(u_t) + \frac{W}{2}\tanh l_t \sin\phi_t \quad \text{- east-west position with lateral offset correction}$$

$$y = f_y(u_t) + \frac{W}{2}\tanh l_t \cos\phi_t \quad \text{- north-east position with lateral offset correction}$$

$$v = v_t \quad \text{- longitudinal speed}$$

$$a = a_t \quad \text{- acceleration}$$

$$\phi = \phi_t \quad \text{- heading}$$

The heading $\phi$ is only used for initializing lane constrained tracks. The tan h(x) function is used to squash the lateral position parameter so that the range of lateral positions is from $$\left[-\frac{W}{2}, \frac{W}{2}\right]$$

where W is the road width. To allow lane changes, this can be modified to $[-W, W]$.

The process covariance Q is given by $$Q = G\Sigma G^T$$

where $$\sum = \begin{pmatrix} \sigma_a^2 & 0 & 0 \\ 0 & \sigma_l^2 & 0 \\ 0 & 0 & \sigma_\phi^2 \end{pmatrix},$$

$\sigma_s^2$ is the longitudinal acceleration rate variance, $\sigma_\phi^2$ is the heading rate variance and $\sigma_l^2$ is the lateral rate variance. It is contemplated that such calculations are the expected rates of each quantity (i.e. change per unit time). In addition, the parameters are manually selected, and may be based on information such as the maximum expected lateral velocity, etc.

The matrix G is given by:

$$G = \begin{pmatrix} \frac{\Delta T^3}{6}\frac{\partial u_{t+1}}{\partial s} & 0 & 0 \\ \frac{\Delta T^2}{2} & 0 & 0 \\ \Delta T & 0 & 0 \\ 0 & \Delta T \frac{2W}{W^2 - 4l^2} & 0 \\ 0 & 0 & \Delta T \end{pmatrix}$$

This matrix G is obtained by performing a Taylor series expansion for the first unmodeled term of the process model, e.g.

$$u_{t+1} \approx g^{-1}\left(s + \Delta T v + \frac{\Delta T^2}{2}a + \frac{\Delta T^3}{6}\dot{a}\right) \approx$$

$$g^{-1}\left(s + \Delta T v + \frac{\Delta T^2}{2}a\right) + \frac{\Delta T^3}{6}\dot{g}^{-1}\left(s + \Delta T v + \frac{\Delta T^2}{2}a\right)\dot{a} =$$

-continued $$u_{t+1} + \frac{\Delta T^3}{6} \frac{\partial u_{t+1}}{\partial s} \dot{a}$$

where $$\dot{g}(u) = \frac{\partial s}{\partial u} \text{ and } \sigma_a^2$$

is the variance of the noise term à.

The splines can be generated from the above results. In exemplary embodiments, the spline used is a quintic $G^2$ spline where the knots are x-y waypoints along the lane and the corresponding lane heading and curvature values. In exemplary embodiments, the map may not provide accurate independent values for the heading and the curvature of the lane but instead provides approximations for the mapping data from the waypoints. The spline is uniformly parameterized, where the domain for segment i is $u \in [i, i+1]$ where u is the spline parameter. Other parameterizations may be used (e.g. based on the approximate path length). A spline library can be used to provide various related functionality. This includes a function for performing function inversion $u=f^{-1}(x,y)$, which allows the spline parameters u to be found for a given (x,y) using linear approximations and gradient descent. Functions are also used to compute nth order derivatives, curvatures and headings as a function of u.

The Kalman Filters (i.e. Robust Kalman filter 1) 1035 and the robust Kalman filter N 1040 for Stationary Hypotheses are as follows: The stationary hypothesis Kalman filters have the following process model:

$$x_{t+1} = x_t$$

$$y_{t+1} = y_t$$

$$v_{t+1} = 0$$

$$a_{t+1} = 0$$

$$\phi_{t+1} = \phi_t$$

and an observation model as follows:

$$x = x_t$$

$$y = y_t$$

$$v = v_t$$

$$a = a_t$$

$$\phi = \phi_t$$

The observation calculations can also be solved using a linear Kalman filter. The process covariance in this case is a simple diagonal matrix with constants representing the variances of each term in the process model.

The Naïve Bayes Models (i.e. classification models 1055) is as follows: Naïve Bayes models (1060, 1065) for the lateral position $p_i$ of each object i are given by: $p_i \sim N(\mu_i, \sigma_i^2)$ For lane constrained models, $\mu_i=0$ and $$\sigma_{mi} = \frac{W}{2}.$$

For roadside parked vehicles, $$\mu_i = \frac{W-V}{2} \text{ and } \sigma_i = \frac{V}{2},$$

where V is the typical width of a target (i.e. a vehicle). For stationary vehicles, $\mu_i = K$ and $$\sigma_i = \frac{K}{2},$$

where K is a large number (e.g. 100). Evaluating these distributions at an observation vector $x_i$ puts forth a result of the likelihood $L_{NB}(x_i)$.

Figure 11:
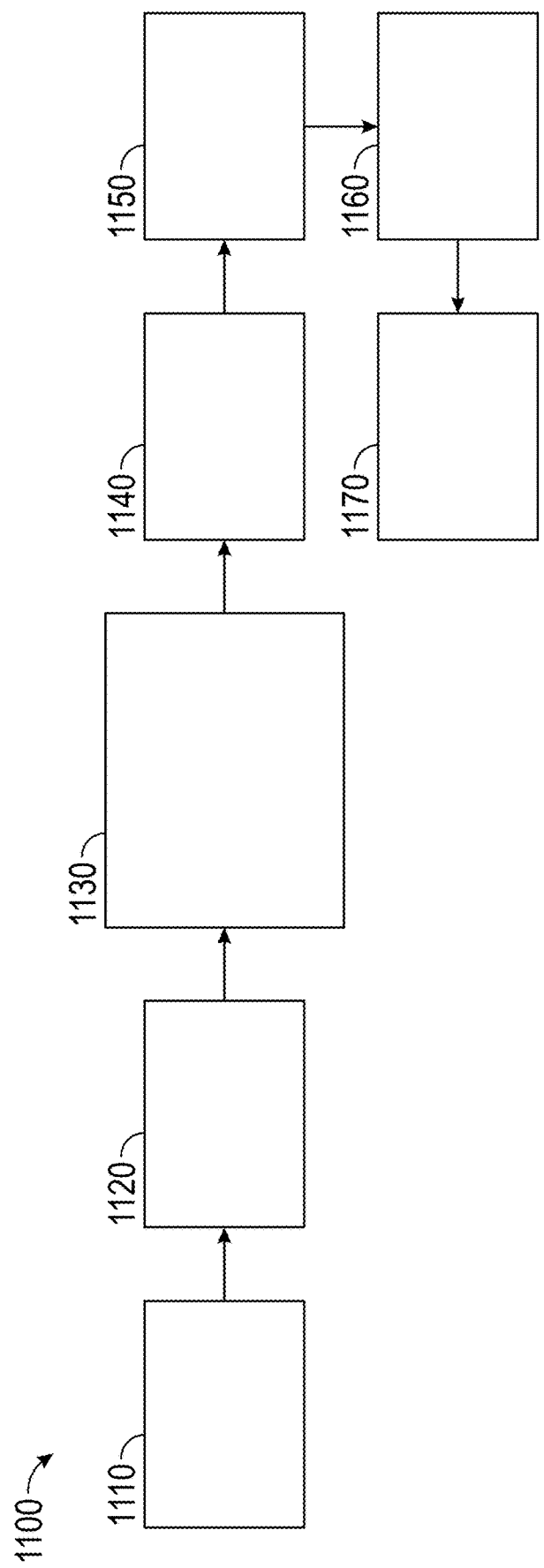
FIG. 11 illustrates a diagram of a targeted object path generation in accordance with an exemplary embodiment.

FIG. 11 illustrates a diagram of a targeted object path generation 1100 in accordance with an embodiment. The maplets 1110 are received for finding (at 1120) lane segments within the horizon. Each lane constrained hypotheses references a single spline, which in turn represents the potential trajectory for the target in the current horizon. These splines are selected from a pool of candidates that are generated from the map (i.e. maplets) by enumerating every possible trajectory for a given target. At 1130, the traversal process of the downstream segments and connections to store waypoint coordinates to create paths takes place. This traversal process often can prove to be computationally expensive due to the large number of possible trajectories resulting from multiple intersections; hence to overcome this obstacle, the horizon is limited to a value of 100 m and the additional processing reduction steps that are employed, such as to limit the number of consecutive intersections used to generate a single trajectory are limited. Once the waypoints for all the trajectories are obtained, at 1140, the subset paths are removed and at 1150 the waypoint heading and curvatures are recomputed in order to determine a set of more accurate heading and curvature values. That is, the heading and curvatures received from the maplets may suffer from inaccuracies and need to be corrected. The recomputing and correction can be performed by a least square computation of a quadratic curve for every three consecutive waypoints (i.e. fitting quantic splines to each path at 1160) and the computing of the heading and curvature values can be derived from coefficients of polynomials from the defining equations used. Due to the uniform parameterization used, this computation can be efficiently performed as only a single matrix multiplying step which is all that is needed or necessary to derive the map paths at 1170.

Figure 12:
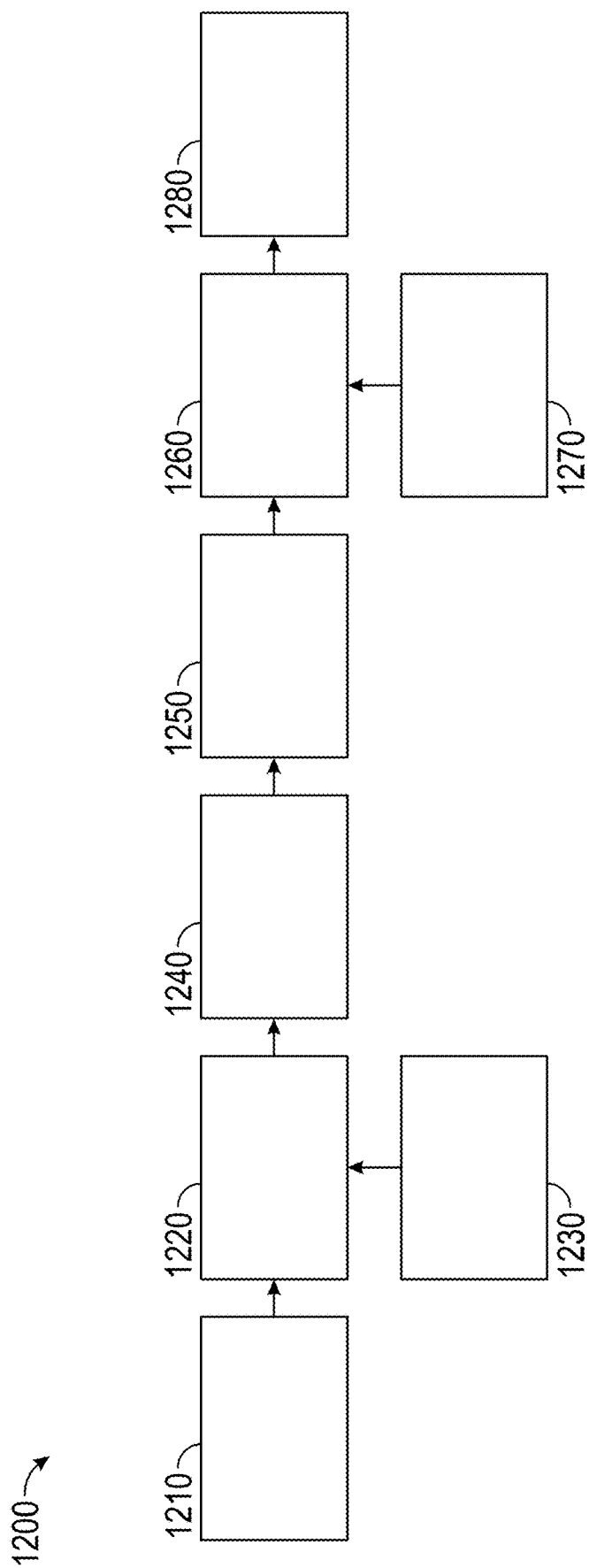
FIG. 12 illustrates a sensor fusing and pre-processing method for the perception system in accordance with an exemplary embodiment.

FIG. 12 illustrates a sensor fusing pre-processing of the perception system in accordance with an embodiment. The input tracks from sensor fusion at 1210 are pre-processed in several different ways before being used to update the hypotheses. The positioning system lightweight communications and marshalling (LCM) message is first used to convert (at 1220) the sensor fusion object positions (at 1230) from host to global cartesian coordinates. The uncertainties in the form of position and velocity standard deviations reported by sensor fusion are then overridden in certain cases to correct for deficiencies. In an exemplary embodiment, for example, their minimum values are clipped (i.e. tune covariances applied at 1240) to a certain level so that they are always treated with some degree of mistrust. The "tuned" uncertainties are then also rotated to the global frame where the co-variances can be converted to HV coordinates (at 1250).

The re-association (at 1260) is performed to account for cases when target IDs suddenly switch value, or a single track splits into multiple ones. The re-association (at 1260) process is performed by finding the MAP predicted position of the target from the existing hypotheses or a current hypotheses at 1270 (i.e. selecting the predicted position from the hypothesis with the highest probability) and gating the new sensor fusion track based on its Mahalanobis distance (equivalent to a gating ellipsoid). The covariance matrix used (for pre-processing targets at 1280) for the Mahalanobis distance computation has a fixed value that is manually tuned for typical lateral and longitudinal as well as velocity uncertainties. The tracks that fall into the gate of an existing track are associated to that existing track.

Figure 13:
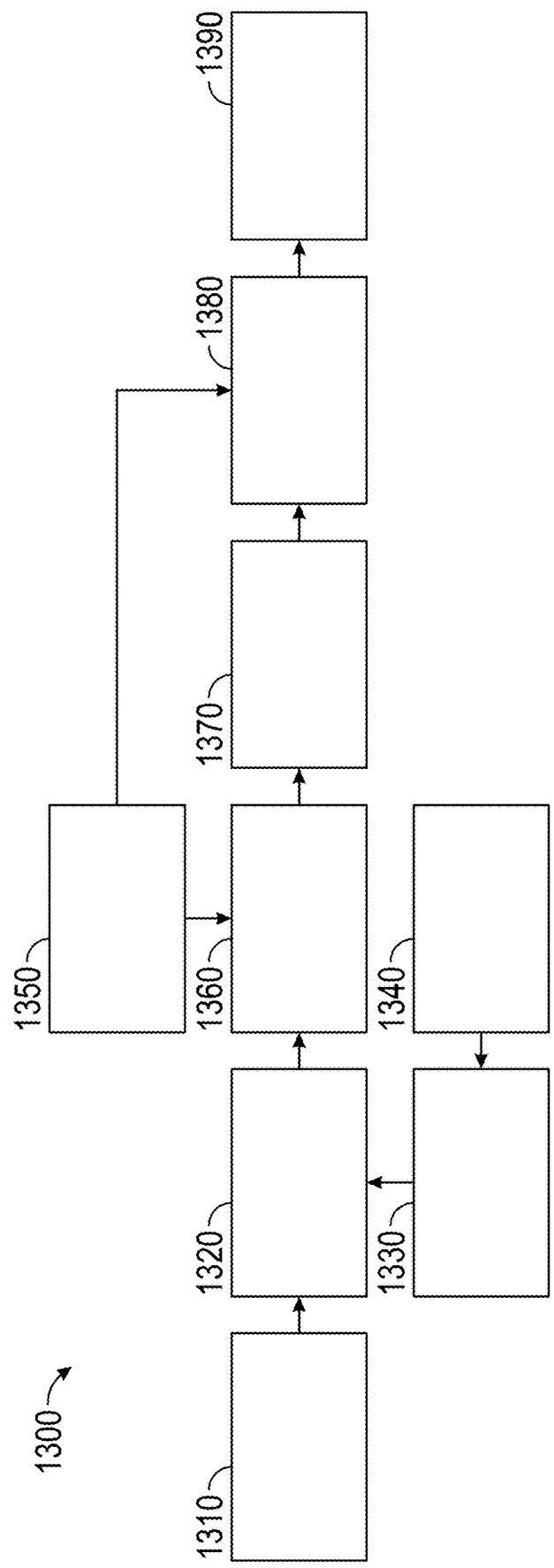
FIG. 13 illustrates a diagram of a hypothesis update method for the perception system in accordance with an exemplary embodiment.

FIG. 13 illustrates a diagram of a hypothesis update 1300 for the perception system in accordance with an embodiment. As each new tracked object is received from sensor fusion, a list of N candidate trajectory splines is generated (at 1320) based on their closest distance to the MAP predicted position (at 1330) of the existing track, or the new track's position (at 1310). The EKFs in existing track constrained hypotheses that already contain one of these splines are updated (at 1360); splines which have no corresponding hypothesis are used to create new hypotheses. Stationary hypotheses are updated directly since the stationary hypotheses do not have splines.

The naïve Bayes models for each hypothesis are then used to update the hypothesis probabilities at 1370 $P(H_{t-1}^i | x_{1:t-1})$ using $$P(H_t^i | x_{1:t}) = \frac{1}{Z} P(H_{t-1}^i | x_{1:t-1}) L_{KF}(x_t) L_{NB}(x_t)$$

where $Z = \Sigma_i P(H_{t-1}^i | x_{1:t-1}) L_{KF}(x_t) L_{NB}(x_t)$ is a normalization factor, $L_{KF}(X)$ is the likelihood of observation x from the EKF and $L_{NB}(X)$ is the naïve Bayes likelihood; for numerical reasons, the log of probabilities are tracked and updated.

The probabilities of the constrained hypotheses that fall below a certain threshold are deleted at 1380. This is to prevent the hypothesis space from potentially growing without any limitations and with hypotheses that are also unlikely to be helpful. The stationary hypotheses are treated differently; that is, when a determined set of probabilities fall below a different threshold, the stationary hypothesis is re-initialized (i.e. pre-processed at 1350). This re-initialization process lends itself to a degree of adaptivity, as the hypotheses that were poorly initialized at the onset (e.g. due to some previous maneuver) may prove to fit better with newer data. The result is at 1390 an updated hypotheses.

Figure 14:
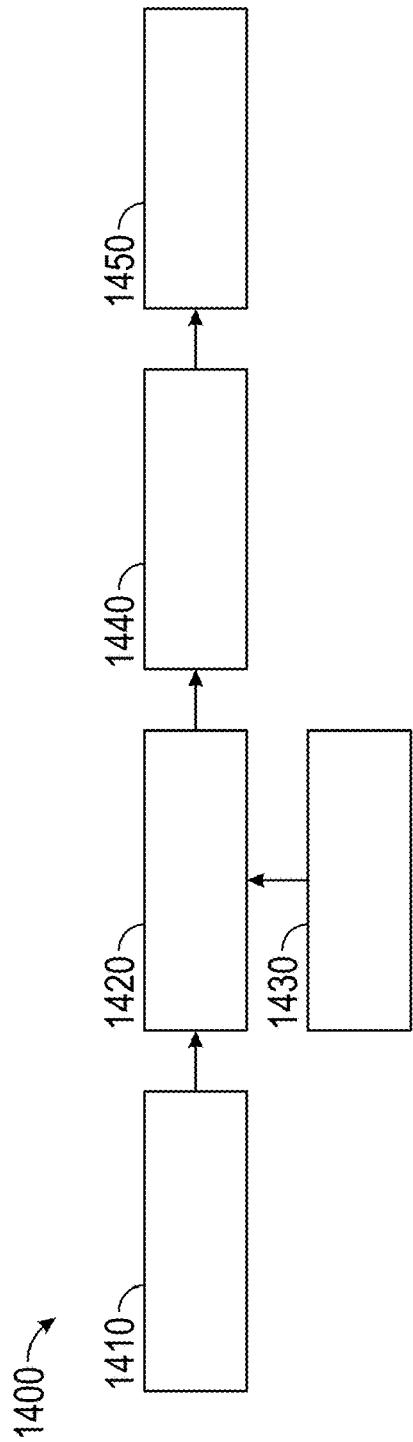
FIG. 14 illustrates a diagram of a hypothesis output method for the perception system in accordance with an exemplary embodiment.

FIG. 14 illustrates a diagram of a hypothesis output flow 1400 for the perception system in accordance with an embodiment. The updated hypotheses 1410 is received. However, before outputting a list of hypothesis (i.e. the output hypotheses 1450), certain checks are performed to determine which hypotheses are feasible and infeasible hypotheses are removed at 1440. The map at 1430 is used to determine at 1420 whether roadside or other classes of parking are allowed at the position of each hypothesis. For example, roadside parking hypotheses are not allowed on main roads and should have probability zero. This step at 1420 essentially applies a prior probability (zero or one in this case) to each hypothesis, based on the map at 1430.

Figure 15:
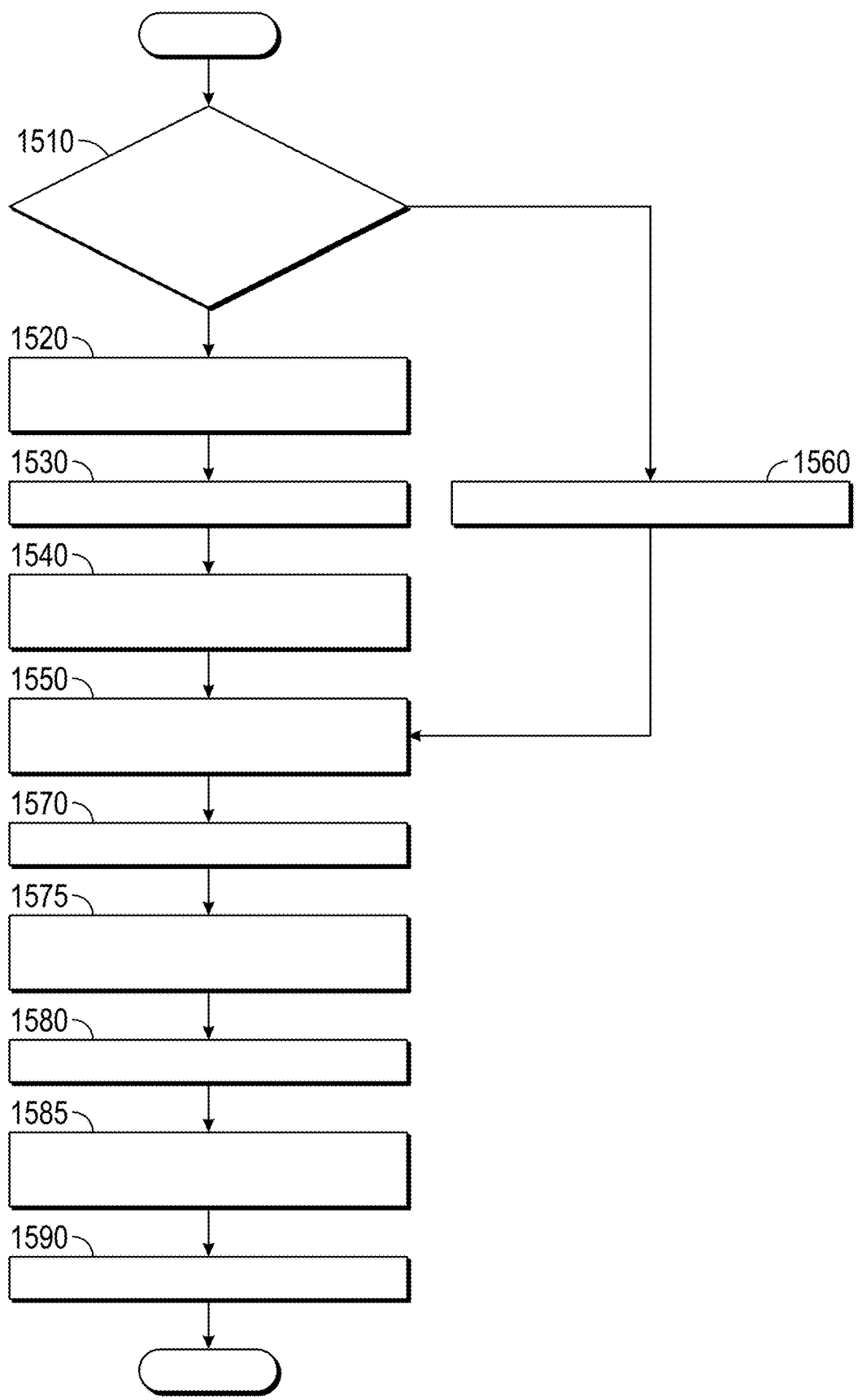
FIG. 15 illustrates a flowchart of the perception model for lane constraint tracking by supervising training in accordance with an exemplary embodiment.

FIG. 15 illustrates a flowchart of the perception model for lane constraint tracking by supervising training in accordance with an exemplary embodiment. At step 1510, a determination is made if the hypotheses already exists for the object ID? (i.e. identified object); if not, the flow continues to step 1520 to find candidate paths about or around the object position. For example, the object can have multiple trajectories of directions and corresponding paths. The perception system utilizes different models for each possible lane constrained target path: such as a straight path, U-turn, left turn, etc. At step 1530, the perception system fits splines for each path. The track objects can have several splines representing nearby potential candidate trajectories. The tracks objects have a vector of Kalman filters for each lane constrained hypothesis (equal to the number of splines) as wells as for the stationary hypotheses (i.e. based on data from the stationary model). The trajectories are vectors of potential lane level trajectories within a current horizon (e.g. 100 m) that a target object may follow (in ground coordinates). At step 1540, the perception system creates hypotheses and initializes hypothesis probabilities. The hypothesis probability is determined at least based on results from filtering models and from results from classifying features related to the object track for the target object. At step 1550, the perception system updates the Kalman filter with object data. The lane constrained models track the object by object vectors using Kalman filters based on each lane constrained hypothesis (equal to the number of splines) as wells as stationary hypotheses, and the unconstrained models track object properties such as acceleration and velocity. An output is generated based on a list of hypothesis with certain checks performed to determine which hypotheses are feasible based on the sensor fusion and maplets (i.e. mapping data). splines which have no corresponding hypothesis are used to create new hypotheses. Stationary hypotheses are updated directly since the stationary hypotheses do not have splines. At 1560, in the alternative, if the hypotheses at step 510 already exists for the object ID, the perception system simply updates paths using the associated hypotheses. At step 1570, after the hypotheses are determined, the features associated with the objects are calculated. The feature computation generates features for classification by the classification models.

At step 1575, the perception system evaluates the likelihood of features using classification models. For example, the path constrained model, the unconstrained model (i.e. constant velocity, acceleration etc. models), and the stationary model (i.e. where zero speed is assumed for the tracked object) send path and object data to the Kalman filters. The track states communicate with the Kalman filters and send track state data to the hypothesis probability update at step 1580. Also, the hypothesis probability update at step 1580 receives data from the classification models because each hypothesis has a corresponding Naïve Bayes model (i.e. classification model) with a likelihood $L_i(x)$. Next at step 1585, delete hypotheses with small probabilities. That is, the probabilities of the constrained hypotheses that fall below a certain threshold are deleted. This prevents the hypothesis space from potentially growing without any limitations and with hypotheses that are also unlikely to be helpful. The stationary hypotheses are treated differently; that is, when a determined set of probabilities fall below a different threshold, the stationary hypothesis is re-initialized. This re-initialization process lends itself to a degree of adaptivity, as the hypotheses that were poorly initialized at the onset (e.g. due to some previous maneuver) may prove to fit better with newer data. The result is an updated hypothesis. At step 1590, the top N hypotheses are outputted as a separate message (where typically N=3) where in each instance a sensor fusion containing an object message is received, the corresponding bank of filters is updated along with the probability of each hypothesis. The hypothesis type and probabilities can then be used by downstream modules to determine lane assignment and dynamic properties of objects. In addition to the Kalman filters, map fusion also implements gating-based association for cases when object IDs switch or are split into multiple tracks.

The various tasks performed in connection with supervised learning and training of the depth estimation model may be performed by software, hardware, firmware, or any combination thereof. For illustrative purposes, the following description of depth image generation, image reconstruction, camera based depth error calculation, radar based range estimation, doppler based range estimation, radar based depth error calculation, doppler based depth error calculation, global loss calculations etc. may refer to elements mentioned above in connection with FIGS. 1-15. In practice, portions of process of FIGS. 1-15 may be performed by different elements of the described system.

It should be appreciated that process of FIGS. 1-15 may include any number of additional or alternative tasks, the tasks shown in FIGS. 1-15 need not be performed in the illustrated order, and process of the FIGS. 1-15 may be incorporated into a more comprehensive procedure or process having additional functionality not described in detail herein. Moreover, one or more of the tasks shown in FIGS. 1-15 could be omitted from an embodiment of the process shown in FIGS. 1-15 as long as the intended overall functionality remains intact.

The foregoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

It should be understood that various changes can be made in the function and arrangement of elements without departing from the scope of the disclosure as set forth in the appended claims and the legal equivalents thereof.

What is claimed is:

1. A method for enhanced object tracking, the method comprising:
    receiving, by a processing unit disposed in a vehicle, sensor fusion data related to a plurality of target objects and object tracks about the vehicle;
    determining, by the processing unit, one or more splines representing trajectories of each target object to an object track;
    filtering, by the processing unit, the sensor fusion data about each target object for an object track based on a first, second and third filtering model, wherein each filtering model corresponds to one or more of hypotheses used for processing vectors related to trajectories of a track object, wherein the hypotheses comprise a path constraint, a path unconstrained, and a stationary hypothesis; and
    generating, by the processing unit, a hypothesis probability for determining whether to use a particular hypothesis, wherein the hypothesis probability is determined based on results from the first, second and third filtering models and from results from classifying, by at least one classification model, one or more features related to the object track for the target object; and
    updating the hypothesis probability, by the processing unit, in a Bayesian manner using a corresponding Naïve Bayes model based on a lateral position for each object, track data comprising at least a track position, and each hypothesis probability.

2. The method of claim 1, further comprising:
    tracking, by the processing unit, the target object, using a process model derived by the path constraint hypothesis, in a Frenet frame; and
    constraining the target object to a position in the process model represented by a parameter $u_t$ of a parametric spline modeled to a center of a lane, and the lateral position represented by a signed distance parameter $l_t$ from the lane center.

3. The method of claim 2, wherein each hypothesis has the corresponding Naïve Bayes model with the likelihood $L_i(x)$ or an applicable joinder model for the $L_i(x)$.

4. The method of claim 3, further comprising:
    updating the hypothesis probability, by the processing unit, in the Bayesian manner using the corresponding Naïve Bayes model of $$P_t(H_i \mid x) = \frac{P_t(H_i \mid x)L_i(x)}{\sum_i P_t(H_i \mid x)L_i(x)}$$

wherein the lateral position is $p_i$ for each object i, x is the track data containing at least the track position and $P_t(H_i|x)$ is the probability of hypothesis i.

5. The method of claim 4, wherein $L_i(x)$ is a product of different likelihoods with priori parameters comprising: $L_i(x)=N(d|\mu=100, \sigma=100) N(v|\mu=0, \sigma=100)$, wherein $N(x|\mu, \sigma)$ is a Gaussian PDF with mean $\mu$ and standard deviation a, and wherein d is the distance to next intersection and v is speed.

6. The method of claim 5, wherein the process model for the track object comprises:

$$u_{t+1} = u_t + \Delta T v_t \frac{\partial u_t}{\partial s}$$

to update spline parameters, $v_{t+1}=v_t+\Delta T a_t$ to update a longitudinal speed, $a_{t+1}=a_t$, to update the longitudinal speed, $l_{t+1}=l_t$ to update a lateral position offset update, and $$\phi_{t+1} = \tan^{-1} \frac{f_{y'}(u_t)}{f_{x'}(u_t)}$$

to update a lane heading wherein $u_n$ is a target spline parameter at discrete time n, $a_n$ is acceleration, and $\phi_n$ is heading angle.

7. The method of claim 6, the path constraint hypothesis further comprising:

an observation model for the track object which comprises:

$$x = f_x(u_t) + \frac{W}{2}\tanh l_t \sin \phi_t$$

for an east-west position with a lateral offset correction, $$y = f_y(u_t) + \frac{W}{2}\tanh l_t \cos \phi_t$$

for a north-east position with the lateral offset correction, $v=v_t$ for the longitudinal speed, $a=a_t$ for acceleration, and $\phi=\phi_t$ for heading wherein $\phi$ is only used for initializing lane constrained tracks and the tan h(x) function is used to squash a lateral position parameter so that a range of a lateral position is from $$\left[-\frac{W}{2}, \frac{W}{2}\right]$$

wherein W is a road width.

8. The method of claim 7, the path unconstraint hypothesis further comprising: generating, a process model, for at least constant velocity for the track object which comprises: $x_{t+1}=x_t+\Delta Tv_t \cos \phi_t$, $y_{t+1}=y_t+\Delta Tv_t \sin \phi_t$, $v_{t+1}=v_t$, $a_{t+1}=a_t$, and $\phi_{t+1}=\phi_t$.

9. The method of claim 8, the path unconstraint hypothesis further comprising: generating, an observation model, for at least constant velocity for the track object which comprises: $x=x_t$, $y=Y_t$, $v=v_t$, $a=a_t$, and $\phi=\phi_t$.

10. The method of claim 9, the stationary hypothesis further comprising: generating, a process model, for at least zero speed for the track object which comprises: $x_{t+1}=x_t$, $y_{t+1}=y_t$, $v_{t+1}=0$, $a_{t+1}=0$ and $\phi_{t+1}=\phi_t$.

11. The method of claim 1, further comprising:
generating, an observation model, for at least constant velocity for the track object which comprises: $x=x_t$, $y=Y_t$, $v=v_t$, $a=a_t$, and $\phi=\phi_t$.

12. The method of claim 1, wherein the spline used is a quintic $G^2$ spline with knots of x-y waypoints along a lane and which corresponds to a lane heading and a curvature value.

13. A system comprising:
a processing unit disposed in a vehicle comprising one or more processors configured by programming instructions encoded on non-transient computer readable media, the processing unit configured to:
receive sensor fusion data related to a plurality of target objects and object tracks about the vehicle;
determine one or more splines representing trajectories of each target object to an object track;
filter the sensor fusion data about each target object for an object track based on a first, second and third filtering model wherein each filtering model corresponds to one or more hypotheses used for processing vectors related to trajectories of a track object wherein the hypotheses comprise a path constraint, a path unconstrained, and a stationary hypothesis; and
generate a hypothesis probability for determining whether to use a particular hypothesis based wherein the hypothesis probability is determined based on results from the first, second and third filtering models and from results from classifying, by at least one classification model, one or more features related to the object track for the target object; and
updating the hypothesis probability, by the processing unit, in a Bayesian manner using a corresponding Naïve Bayes model based on a lateral position for each object, track data comprising at least a track position, and each hypothesis probability.

14. The system of claim 13, further comprising:
the processing unit configured to:
track the target object, using a process model derived by the path constraint hypothesis, in a Frenet frame, and
constrain the target object to a position in the process model represented by a parameter $u_t$ of a parametric spline modeled to a center of a lane, and the lateral position represented by a signed distance parameter $l_t$ from the lane center.

15. The system of claim 14, wherein each hypothesis has the corresponding Naïve Bayes model with the likelihood $L_i(x)$ or an applicable joinder model for the $L_i(x)$.

16. The system of claim 15, further comprising:
the processing unit configured to:
update the hypothesis probability in the Bayesian manner using the corresponding Naïve Bayes model of $$P_t(H_i \mid x) = \frac{P_t(H_i \mid x)L_i(x)}{\sum_i P_t(H_i \mid x)L_i(x)}$$

wherein the lateral position is $p_i$ for each object i, x is track data containing at least the track position and $P_t(H_i|x)$ is the probability of hypothesis i.

17. The system of claim 16, wherein L(x) is product of different likelihoods with priori parameters comprising: $L(x)=N(d|\mu=100, \sigma=100)N(v|\mu=0, \sigma=100)$ wherein $N(x|\mu, \sigma)$ is a Gaussian PDF with mean $\mu$ and standard deviation $\sigma$, d is the distance to next intersection, and v is speed.

18. The system of claim 17, wherein the process model for the track object comprises:

$$u_{t+1} = u_t + \Delta Tv_t \frac{\partial u_t}{\partial s}$$

to update spline parameters, $v_{t+1}=v_t+\Delta Ta_t$ to update a longitudinal speed, $a_{t+1}=a_t$ to update the longitudinal speed, $l_{t+1}=l_t$ to update a lateral position offset update, and $$\phi_{t+1} = \tan^{-1}\frac{f_{y'}(u_t)}{f_{x'}(u_t)}$$

to update a lane heading.

19. The system of claim 18, the path constraint hypothesis further comprising:
an observation model for the track object which comprises:

$$x = f_x(u_t) + \frac{W}{2}\tanh l_t \sin \phi_t$$

for an east-west position with a lateral offset correction, $$y = f_y(u_t) + \frac{W}{2}\tanh l_t \, \cos \phi_t$$

for a north-east position with the lateral offset correction, $v=v_t$ for the longitudinal speed, $a=a_t$ for acceleration, and $\phi=\phi_t$ for heading.

20. A vehicle, comprising a perception unit comprising one or more processors and non-transient computer readable media encoded with programming instructions, the perception unit is configured to:
receive sensor fusion data related to a plurality of target objects and object tracks about the vehicle;
determine one or more splines representing trajectories of each target object to an object track;
filter the sensor fusion data about each target object for an object track based on a first, second and third filtering model wherein each filtering model corresponds to one or more of a set of hypotheses used for processing vectors related to trajectories of a track object wherein the set of hypotheses comprise: a path constraint, a path unconstrained, and a stationary hypothesis; and
generate a hypothesis probability for determining whether to use a particular hypothesis based wherein the hypothesis probability is determined based on results from the first, second and third filtering models and from results from classifying, by at least one classification model, one or more features related to the object track for the target object; and
update the hypothesis probability, by the processing unit, in a Bayesian manner using a Naïve Bayes model based on a lateral position for each object, track data comprising at least a track position, and each hypothesis probability.

\* \* \* \* \*